US009053185B1

(12) United States Patent
Liu et al.

(10) Patent No.: US 9,053,185 B1
(45) Date of Patent: Jun. 9, 2015

(54) GENERATING A REPRESENTATIVE MODEL FOR A PLURALITY OF MODELS IDENTIFIED BY SIMILAR FEATURE DATA

(75) Inventors: Jia Liu, Sunnyvale, CA (US); Yijian Bai, San Ramon, CA (US); Manojav Patil, Sunnyvale, CA (US); Deepak Ravichandran, Mountain View, CA (US); Sittichai Jiampojamarn, Sunnyvale, CA (US); Shankar Ponnekanti, Mountain View, CA (US)

(73) Assignee: Google Inc., Mountain View, CA (US)

( * ) Notice: Subject to any disclaimer, the term of this patent is extended or adjusted under 35 U.S.C. 154(b) by 463 days.

(21) Appl. No.: 13/460,469

(22) Filed: Apr. 30, 2012

(51) Int. Cl.
  *G06F 17/00* (2006.01)
  *G06Q 30/00* (2012.01)
  *G06F 17/30* (2006.01)
  *G06Q 30/02* (2012.01)

(52) U.S. Cl.
  CPC ...... *G06F 17/30864* (2013.01); *G06Q 30/0277* (2013.01); *G06Q 30/0253* (2013.01); *G06Q 30/0256* (2013.01)

(58) Field of Classification Search
  None
  See application file for complete search history.

(56) References Cited

U.S. PATENT DOCUMENTS

| 5,901,255 | A | 5/1999 | Yagasaki |
| 5,974,398 | A | 10/1999 | Hanson et al. |
| 6,185,514 | B1 | 2/2001 | Skinner et al. |
| 6,266,649 | B1 | 7/2001 | Linden et al. |
| 6,269,351 | B1 | 7/2001 | Black |
| 6,295,504 | B1 | 9/2001 | Ye et al. |
| 6,487,538 | B1 | 11/2002 | Gupta et al. |
| 6,539,375 | B2 | 3/2003 | Kawasaki |
| 6,560,578 | B2 | 5/2003 | Eldering |
| 6,567,797 | B1 | 5/2003 | Schuetze et al. |
| 6,581,058 | B1 | 6/2003 | Fayyad et al. |
| 6,598,054 | B2 * | 7/2003 | Schuetze et al. ............ 1/1 |
| 6,973,436 | B1 | 12/2005 | Shkedi |
| 6,982,726 | B1 | 1/2006 | Berestov |
| 7,003,566 | B2 | 2/2006 | Codella et al. |
| 7,103,584 | B2 | 9/2006 | Lee |
| 7,202,791 | B2 | 4/2007 | Trajkovic |
| 7,203,909 | B1 | 4/2007 | Horvitz et al. |
| 7,257,546 | B2 | 8/2007 | Ebrahimi et al. |
| 7,272,065 | B2 | 9/2007 | Lovett |
| 7,454,705 | B2 | 11/2008 | Cadez et al. |

(Continued)

OTHER PUBLICATIONS

U.S. Appl. No. 13/362,910, filed Jan. 31, 2012, Jia Liu et al.

(Continued)

*Primary Examiner* — Kibrom K Gebresilassie
(74) *Attorney, Agent, or Firm* — Foley and Lardner LLP; John D. Lanza

(57) ABSTRACT

A computerized method for generating a representative model for a plurality of different models identified by similar feature data. A processing circuit receives a plurality of different models, each model configured for use in generating a second set of network user identifiers based on a first set of network user identifiers. The processing circuit receives feature data for each of the plurality of different models, each feature data having a corresponding feature weight data. The processing circuit identifies similar models within the plurality of different models based on a similarity of the feature data between models within the plurality of different models. The processing circuit generates the representative model to represent the similar models. The representative model may be used to generate the second set of network user identifiers based on the feature data and corresponding weight data of the representative model.

13 Claims, 4 Drawing Sheets

(56) References Cited

U.S. PATENT DOCUMENTS

| | | |
|---|---|---|
| 7,685,278 B2 | 3/2010 | Cohen et al. |
| 7,689,458 B2 | 3/2010 | Heckerman et al. |
| 7,693,836 B2 | 4/2010 | Brave et al. |
| 7,693,863 B2 | 4/2010 | Martin et al. |
| 7,711,735 B2 | 5/2010 | Wu et al. |
| 7,734,632 B2 | 6/2010 | Wang |
| 7,739,314 B2 | 6/2010 | Datar et al. |
| 7,769,786 B2 | 8/2010 | Patel |
| 7,809,740 B2 | 10/2010 | Chung et al. |
| 7,822,636 B1 | 10/2010 | Ferber et al. |
| 7,882,175 B1 | 2/2011 | Nayfeh et al. |
| 7,904,448 B2 | 3/2011 | Chung et al. |
| 7,908,238 B1 | 3/2011 | Nolet et al. |
| 8,026,944 B1 | 9/2011 | Sah |
| 8,027,964 B2 | 9/2011 | Boulis |
| 8,082,189 B2 * | 12/2011 | Fushimi et al. ............. 705/26.9 |
| 8,095,484 B2 | 1/2012 | Cheng et al. |
| 8,095,523 B2 | 1/2012 | Brave et al. |
| 8,117,211 B2 | 2/2012 | Yamamoto et al. |
| 8,131,733 B2 | 3/2012 | Wang |
| 8,260,656 B1 | 9/2012 | Harbick et al. |
| 8,321,934 B1 | 11/2012 | Cooley et al. |
| 8,355,958 B2 * | 1/2013 | Fushimi et al. ............. 705/26.9 |
| 8,363,544 B2 | 1/2013 | Fishteyn et al. |
| 8,370,321 B2 | 2/2013 | Chu et al. |
| 8,386,519 B2 * | 2/2013 | Kenedy et al. ................ 707/784 |
| 8,527,526 B1 | 9/2013 | Liu et al. |
| 8,566,422 B2 | 10/2013 | Johnson et al. |
| 8,655,695 B1 | 2/2014 | Qu et al. |
| 8,756,163 B2 | 6/2014 | Schleier-Smith |
| 8,768,867 B1 | 7/2014 | Thaeler et al. |
| 8,825,802 B2 * | 9/2014 | Pearce ......................... 709/218 |
| 2002/0087315 A1 | 7/2002 | Lee et al. |
| 2002/0099702 A1 | 7/2002 | Oddo |
| 2003/0033196 A1 | 2/2003 | Tomlin |
| 2003/0033336 A1 | 2/2003 | Gremmert |
| 2003/0074368 A1 | 4/2003 | Schuetze et al. |
| 2003/0220975 A1 | 11/2003 | Malik |
| 2004/0030667 A1 | 2/2004 | Xu et al. |
| 2004/0090472 A1 | 5/2004 | Risch et al. |
| 2004/0172415 A1 * | 9/2004 | Messina et al. ............ 707/104.1 |
| 2004/0215509 A1 | 10/2004 | Perry |
| 2005/0049907 A1 | 3/2005 | Kumar et al. |
| 2005/0086105 A1 | 4/2005 | McFadden et al. |
| 2006/0015487 A1 | 1/2006 | Vest |
| 2006/0026062 A1 | 2/2006 | Collins |
| 2006/0059144 A1 | 3/2006 | Canright et al. |
| 2006/0064411 A1 | 3/2006 | Gross et al. |
| 2006/0069612 A1 | 3/2006 | Hurt et al. |
| 2006/0069616 A1 | 3/2006 | Bau |
| 2006/0100008 A1 | 5/2006 | Wright et al. |
| 2006/0136294 A1 | 6/2006 | Linden et al. |
| 2006/0136589 A1 | 6/2006 | Konig et al. |
| 2006/0241923 A1 | 10/2006 | Xu et al. |
| 2006/0248035 A1 | 11/2006 | Gendler et al. |
| 2007/0038659 A1 | 2/2007 | Datar et al. |
| 2007/0061195 A1 | 3/2007 | Liu et al. |
| 2007/0067297 A1 | 3/2007 | Kublickis |
| 2007/0073579 A1 | 3/2007 | Immorlica et al. |
| 2007/0130005 A1 | 6/2007 | Jaschke |
| 2007/0156458 A1 | 7/2007 | Benja-Athon et al. |
| 2007/0156519 A1 | 7/2007 | Agassi et al. |
| 2007/0179846 A1 | 8/2007 | Jain et al. |
| 2007/0233556 A1 | 10/2007 | Koningstein |
| 2007/0239553 A1 * | 10/2007 | Lin et al. ..................... 705/26 |
| 2007/0250390 A1 * | 10/2007 | Lee et al. ..................... 705/14 |
| 2008/0071929 A1 | 3/2008 | Motte et al. |
| 2008/0108308 A1 | 5/2008 | Ullah |
| 2008/0126176 A1 | 5/2008 | Iguchi |
| 2008/0140524 A1 | 6/2008 | Anand et al. |
| 2008/0147659 A1 | 6/2008 | Chen et al. |
| 2008/0154717 A1 | 6/2008 | Saifee et al. |
| 2008/0183318 A1 | 7/2008 | Carrabis |
| 2008/0189174 A1 | 8/2008 | Moore |
| 2008/0201216 A1 | 8/2008 | Almeida |
| 2008/0215348 A1 | 9/2008 | Guldimann et al. |
| 2008/0294584 A1 | 11/2008 | Herz |
| 2008/0300958 A1 | 12/2008 | Gluck |
| 2009/0006974 A1 | 1/2009 | Harinarayan et al. |
| 2009/0012852 A1 | 1/2009 | O'Kelley et al. |
| 2009/0048925 A1 | 2/2009 | Song et al. |
| 2009/0077495 A1 | 3/2009 | Bhat et al. |
| 2009/0164274 A1 | 6/2009 | Narayanaswamy et al. |
| 2009/0164395 A1 | 6/2009 | Heck |
| 2009/0222734 A1 | 9/2009 | Fuller et al. |
| 2009/0228397 A1 | 9/2009 | Tawakol et al. |
| 2009/0248494 A1 | 10/2009 | Hueter et al. |
| 2009/0248496 A1 | 10/2009 | Hueter et al. |
| 2009/0265230 A1 * | 10/2009 | Plachouras et al. ............. 705/14 |
| 2009/0265243 A1 | 10/2009 | Karassner et al. |
| 2009/0265290 A1 * | 10/2009 | Ciaramita et al. ............. 706/12 |
| 2009/0281923 A1 | 11/2009 | Selinger et al. |
| 2009/0282016 A1 * | 11/2009 | Gabrilovich et al. ............. 707/5 |
| 2009/0292386 A1 | 11/2009 | Cheng et al. |
| 2009/0327032 A1 | 12/2009 | Gunawardana et al. |
| 2010/0004975 A1 | 1/2010 | White et al. |
| 2010/0023382 A1 * | 1/2010 | Fushimi et al. ................. 705/10 |
| 2010/0030859 A1 * | 2/2010 | Huang ........................ 709/206 |
| 2010/0042500 A1 | 2/2010 | Pritchard et al. |
| 2010/0042502 A1 | 2/2010 | Farmanfarmaian et al. |
| 2010/0082421 A1 | 4/2010 | Tuladhar et al. |
| 2010/0121671 A1 | 5/2010 | Boutilier et al. |
| 2010/0121850 A1 | 5/2010 | Moitra et al. |
| 2010/0131835 A1 | 5/2010 | Kumar et al. |
| 2010/0138291 A1 | 6/2010 | Silverman et al. |
| 2010/0169338 A1 * | 7/2010 | Kenedy et al. ................ 707/758 |
| 2010/0169342 A1 * | 7/2010 | Kenedy et al. ................ 707/758 |
| 2010/0174724 A1 | 7/2010 | Wallace et al. |
| 2010/0217648 A1 * | 8/2010 | Agarwal et al. ................. 705/10 |
| 2010/0223258 A1 | 9/2010 | Ghahramani et al. |
| 2010/0228614 A1 | 9/2010 | Zhang et al. |
| 2010/0235241 A1 | 9/2010 | Wang et al. |
| 2010/0250558 A1 | 9/2010 | Wang |
| 2010/0262568 A1 | 10/2010 | Schwaighofer et al. |
| 2010/0268578 A1 * | 10/2010 | Fushimi et al. ................. 705/10 |
| 2010/0274753 A1 | 10/2010 | Liberty et al. |
| 2010/0293057 A1 | 11/2010 | Haveliwala et al. |
| 2010/0318374 A1 | 12/2010 | Flake et al. |
| 2010/0325666 A1 | 12/2010 | Wiser et al. |
| 2011/0010324 A1 | 1/2011 | Bolivar et al. |
| 2011/0055008 A1 | 3/2011 | Feuerstein et al. |
| 2011/0055012 A1 | 3/2011 | Christianson et al. |
| 2011/0071900 A1 | 3/2011 | Kamath et al. |
| 2011/0077998 A1 * | 3/2011 | Yan et al. ........................ 705/10 |
| 2011/0106796 A1 | 5/2011 | Svaic |
| 2011/0145248 A1 | 6/2011 | Doliov |
| 2011/0153423 A1 | 6/2011 | Elvekrog et al. |
| 2011/0166926 A1 | 7/2011 | Lv et al. |
| 2011/0166932 A1 | 7/2011 | Smith et al. |
| 2011/0173198 A1 | 7/2011 | Malleshaiah et al. |
| 2011/0191170 A1 | 8/2011 | Zhang et al. |
| 2011/0191176 A1 | 8/2011 | Merriman et al. |
| 2011/0191714 A1 | 8/2011 | Ting et al. |
| 2011/0196716 A1 | 8/2011 | Srinivasan et al. |
| 2011/0212783 A1 * | 9/2011 | Dale et al. ........................ 463/42 |
| 2011/0225608 A1 | 9/2011 | Lopatecki et al. |
| 2011/0231241 A1 | 9/2011 | Kesari et al. |
| 2011/0231257 A1 | 9/2011 | Winters |
| 2011/0231264 A1 | 9/2011 | Dilling et al. |
| 2011/0246267 A1 | 10/2011 | Williams et al. |
| 2011/0246298 A1 | 10/2011 | Williams et al. |
| 2011/0258039 A1 | 10/2011 | Patwa et al. |
| 2011/0264522 A1 | 10/2011 | Chan et al. |
| 2011/0270560 A1 | 11/2011 | Wang et al. |
| 2011/0288937 A1 | 11/2011 | Manoogian et al. |
| 2011/0295612 A1 | 12/2011 | Donneau-Golencer et al. |
| 2012/0010939 A1 | 1/2012 | Krishnamoorthy et al. |
| 2012/0036015 A1 * | 2/2012 | Sheikh ........................ 705/14.54 |
| 2012/0047013 A1 | 2/2012 | Bigby et al. |
| 2012/0047022 A1 | 2/2012 | Shamim et al. |
| 2012/0047132 A1 | 2/2012 | Fleming et al. |
| 2012/0047430 A1 * | 2/2012 | Williams ..................... 715/239 |
| 2012/0054009 A1 | 3/2012 | Furman et al. |
| 2012/0059707 A1 | 3/2012 | Goenka et al. |

(56) References Cited

U.S. PATENT DOCUMENTS

| | | | |
|---|---|---|---|
| 2012/0059717 A1 | 3/2012 | Furman et al. | |
| 2012/0109734 A1* | 5/2012 | Fordyce et al. | 705/14.25 |
| 2012/0131034 A1* | 5/2012 | Kenedy et al. | 707/767 |
| 2012/0143687 A1* | 6/2012 | Fushimi et al. | 705/14.53 |
| 2012/0166530 A1 | 6/2012 | Tseng | |
| 2012/0179543 A1 | 7/2012 | Luo et al. | |
| 2012/0191745 A1* | 7/2012 | Velipasaoglu et al. | 707/767 |
| 2012/0197608 A1 | 8/2012 | Pinto et al. | |
| 2012/0209568 A1 | 8/2012 | Arndt et al. | |
| 2012/0239506 A1 | 9/2012 | Saunders et al. | |
| 2012/0253928 A1 | 10/2012 | Jackson et al. | |
| 2012/0254184 A1* | 10/2012 | Choudhary et al. | 707/738 |
| 2012/0271782 A1 | 10/2012 | Blowers et al. | |
| 2012/0316972 A1 | 12/2012 | Hu et al. | |
| 2013/0006778 A1* | 1/2013 | Raghunandan | 705/14.66 |
| 2013/0047076 A1 | 2/2013 | McElfresh et al. | |
| 2013/0054628 A1* | 2/2013 | Meierhoefer et al. | 707/758 |
| 2013/0091001 A1 | 4/2013 | Jia et al. | |
| 2013/0124259 A1 | 5/2013 | Chourey et al. | |
| 2013/0124298 A1 | 5/2013 | Li et al. | |
| 2013/0124449 A1 | 5/2013 | Pinckney et al. | |
| 2013/0125012 A1 | 5/2013 | Ganesan et al. | |
| 2013/0132415 A1 | 5/2013 | Adams | |
| 2013/0151312 A1 | 6/2013 | Logan | |
| 2013/0346182 A1 | 12/2013 | Cheng et al. | |
| 2014/0181064 A1* | 6/2014 | Di Cocco et al. | 707/706 |
| 2014/0214842 A1 | 7/2014 | Lu et al. | |

OTHER PUBLICATIONS

U.S. Appl. No. 13/460,327, filed Apr. 30, 2012, Jia Liu et al.
U.S. Appl. No. 13/460,411, filed Apr. 30, 2012, Jia Liu et al.
U.S. Appl. No. 13/462,130, filed May 2, 2012, Jia Liu et al.
U.S. Appl. No. 13/462,425, filed May 2, 2012, Jia Liu et al.
U.S. Appl. No. 13/462,509, filed May 2, 2012, Jia Liu et al.
U.S. Appl. No. 13/462,630, filed May 2, 2012, Jia Liu et al.
U.S. Appl. No. 13/465,679, filed May 7, 2012, Alok Goel et al.
U.S. Appl. No. 13/465,730, filed May 7, 2012, Jia Liu et al.
U.S. Appl. No. 13/465,762, filed May 7, 2012, Jia Liu et al.
U.S. Appl. No. 13/476,532, filed May 21, 2012, Jia Liu et al.
U.S. Appl. No. 13/534,480, filed Jun. 27, 2012, Jia Liu et al.
U.S. Appl. No. 13/550,073, filed Jul. 16, 2012, Jia Liu et al.
U.S. Appl. No. 13/551,236, filed Jul. 17, 2012, Jia Liu et al.
U.S. Appl. No. 13/362,671, filed Jan. 31, 2012, Jia Liu et al.
U.S. Appl. No. 13/362,797, filed Jan. 31, 2012, Jia Liu et al.
"Clustering II" Powerpoint, EECS435, Spring 2008, 25 pages.
Bhat, Sudin, et al.; "Dynamic Real-Time Targeting Through Variable-Length Behavioral History", Apr. 18, 2009, © 2009 Microsoft, 4 pages.
http://en.wikipedia.org/wiki/Cluster_analysis; "Cluster Analysis", Wikipedia.org, retrieved Jan. 27, 2012, 15 pages.
http://en.wikipedia.org/wiki/Logistic_regression; "Logistic Regression", Wikipedia.org, retrieved Apr. 2, 2012, 14 pages.
Johnson, Mark; "Confidence Intervals on Likelihood Estimates for Estimating Association Strengths", Brown University, Draft of May, 28, 1999, 7 pages.
Renals, Steve; "Classification and Nearest Neighbours"; Informatics 2B: Learning and Data Lecture 4, Jan. 28, 2011, 27 pages.
support.google.com/adwords/bin/answer.py?hl=en&answer=1209882; "Where Your Ad Can Appear on the Display Network Depending on Your Targeting Methods", support.google.com, retrieved Apr. 16, 2012, 4 pages.
support.google.com/adwords/bin/answer.py?hl=en&answer=171271; "How Do I Create a Custom Combination List?", support.google.com, retrieved Apr. 16, 2012, 3 pages.
www.techterms.com/definition/rpm; "RPM", © 2012 TechTerms.com, retrieved Apr. 9, 2012, 1 page.
Notice of Allowance on U.S. Appl. No. 13/462,130 dated Apr. 22, 2013.
Office Action on U.S. Appl. No. 13/362,671 dated May 8, 2013.
Office Action on U.S. Appl. No. 13/362,797 dated Apr. 24, 2013.
Office Action on U.S. Appl. No. 13/462,630 dated May 8, 2013.
Office Action on U.S. Appl. No. 13/550,073 dated Jun. 3, 2013.
Notice of Allowance on U.S. Appl. No. 13/551,236 dated Jan. 30, 2014.
Notice of Allowance on U.S. Appl. No. 13/551,236 dated May 22, 2014.
Office Action on U.S. Appl. No. 13/362,671 dated Dec. 31, 2013.
Office Action on U.S. Appl. No. 13/362,910 dated Sep. 11, 2013.
Office Action on U.S. Appl. No. 13/363,356 dated Mar. 14, 2014.
Office Action on U.S. Appl. No. 13/462,425 dated Mar. 12, 2014.
Office Action on U.S. Appl. No. 13/462,509 dated Dec. 27, 2013.
Office Action on U.S. Appl. No. 13/462,630 dated Jan. 14, 2014.
Office Action on U.S. Appl. No. 13/465,762 dated Jan. 16, 2014.
Office Action on U.S. Appl. No. 13/476,532 dated Dec. 30, 2013.
Office Action on U.S. Appl. No. 13/550,073 dated Oct. 22, 2013.
Office Action on U.S. Appl. No. 13/550,073 dated Feb. 10, 2014.
Non-Final Office Action on U.S. Appl. No. 13/363,353 dated Apr. 22, 2014.
Non-Final Office Action on U.S. Appl. No. 13/465,679 dated Apr. 14, 2014.
Notice of Allowance on U.S. Appl. No. 13/598,331 dated Mar. 20, 2014.
Office Action on U.S. Appl. No. 13/362,910 dated Apr. 8, 2014.
Office Action on U.S. Appl. No. 13/460,411 dated Jul. 15, 2014.
U.S. Notice of Allowance on U.S. Appl. No. 13/550,073 dated Jun. 27, 2014.
U.S. Office Action on U.S. Appl. No. 13/362,671 dated Jun. 30, 2014.
Notice of Allowance on U.S. Appl. No. 13/476,532 dated Aug. 20, 2014.
Notice of Allowance on U.S. Appl. No. 13/534,480 dated Jul. 30, 2014.
Notice of Allowance on U.S. Appl. No. 13/598,331 dated Jul. 31, 2014.
Office Action on U.S. Appl. No. 13/363,356 dated Aug. 13, 2014.
Office Action on U.S. Appl. No. 13/460,327 dated Aug. 21, 2014.
Office Action on U.S. Appl. No. 13/462,425 dated Aug. 1, 2014.
Office Action on U.S. Appl. No. 13/462,509 dated Aug. 26, 2014.
Office Action on U.S. Appl. No. 13/465,730 dated Aug. 26, 2014.
Office Action on U.S. Appl. No. 13/465,762 dated Aug. 27, 2014.
US Office Action for U.S. Appl. No. 13/462,630, dated Sep. 23, 2014.
US Office Action in U.S. Appl No. 13/465,679 DTD Nov. 17, 2014.
US Office Action on U.S. Appl. No. 13/363,353 DTD Sep. 19, 2014.

* cited by examiner

GENERATING A REPRESENTATIVE MODEL FOR A PLURALITY OF MODELS IDENTIFIED BY SIMILAR FEATURE DATA

BACKGROUND

The present disclosure relates generally to determining similar user identifiers.

Information about online users is often unavailable to interested parties, such as website owners and online advertisers. From an advertiser's perspective, placing an advertisement on a web page may or may not be of interest or useful for the end users viewing the web page. In some systems, the content of a web page may be used to help advertisers select advertisements to be provided with the web page. For example, an advertiser selling golf clubs may advertise on a website devoted to golf, since visitors to the website may share a common interest in golf. Such systems may use keywords located in the text of the website to identify topics discussed on the website.

SUMMARY

One or more implementations described herein provides a computerized method for generating a representative model for a plurality of different models identified by similar feature data. A processing circuit receives a plurality of different models, each model configured for use in generating a second set of network user identifiers based on a first set of network user identifiers. The processing circuit receives feature data for each of the plurality of different models, each feature data having a corresponding feature weight data. The processing circuit identifies similar models within the plurality of different models based on a similarity of the feature data between models within the plurality of different models. The processing circuit generates the representative model to represent the similar models. The representative model may be used to generate the second set of network user identifiers based on the feature data and corresponding weight data of the representative model.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION OF ILLUSTRATIVE IMPLEMENTATIONS

Figure 1:
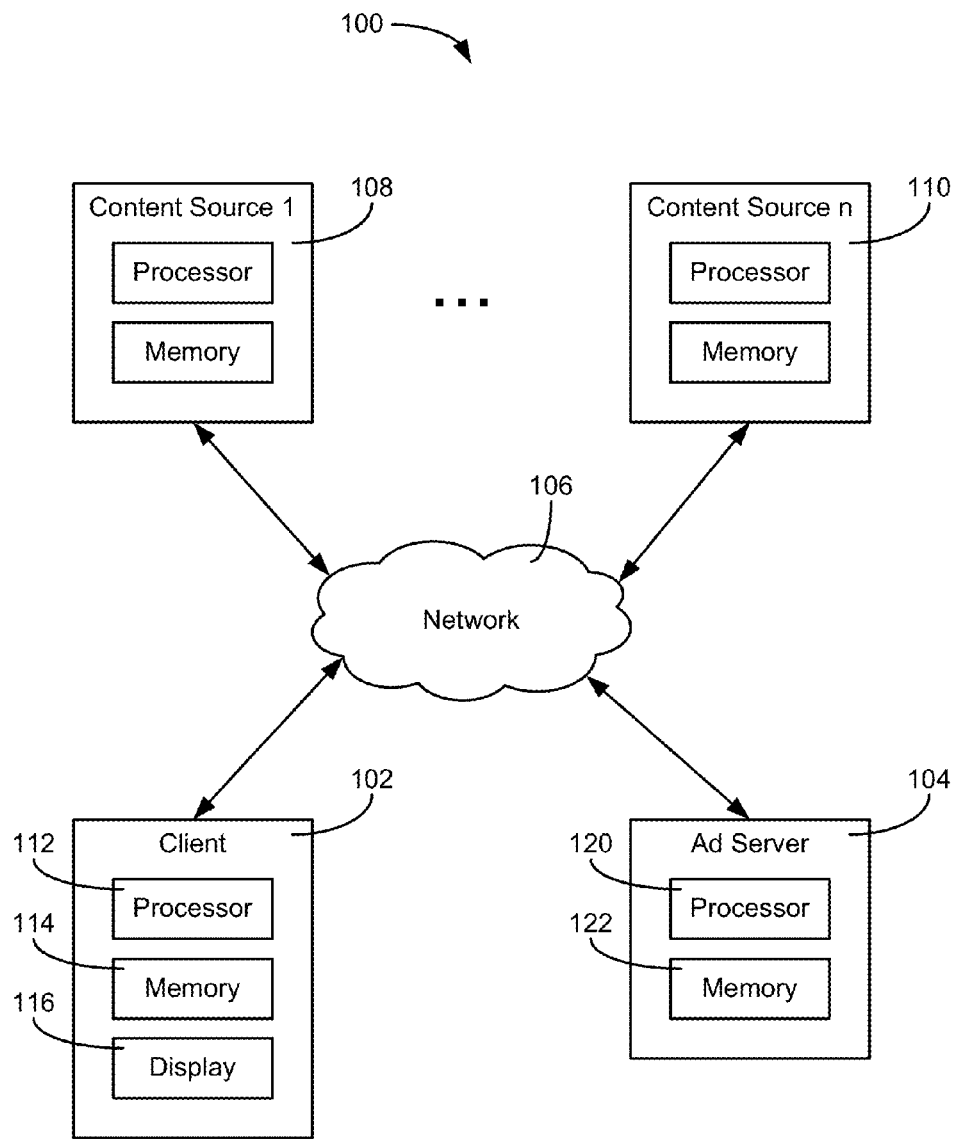
FIG. 1 is a block diagram of a computer system in accordance with an illustrative implementation.

According to some aspects of the present disclosure, the online behaviors of user identifiers may be used to provide audience-based advertising. As used herein, online behavior refers to how a user identifier interacts with web pages on the Internet (e.g., which web pages are visited, the order in which the web pages are visited, how long a particular web page is viewed, and similar information). In some implementations, a set of user identifiers associated with an online event (e.g., making an online purchase, being added to an advertiser's list of user identifiers, etc.) may be used as a basis to determine user identifiers having similar online behaviors.

A user may opt in or out of allowing an advertisement server to identify and store information about the user and/or about devices operated by the user. For example, the user may opt in to receiving advertisements from the advertisement server that may be more relevant to the user. In some implementations, the user may be represented as a randomized user identifier (e.g., a cookie, a device serial number, etc.) that contains no personally-identifiable information about the user. For example, information relating to the user's name, demographics, etc., may not be used by the advertisement server unless the user opts in to providing such information. Thus, the user may have control over how information is collected about him or her and used by an advertisement server.

In content-based advertising systems, advertisements are provided based on the content of a web page. For example, a web page devoted to golf may mention the terms "golf" and other golf-related terms. An advertising system that places advertisements on the web page may use the content of the web page itself and/or terms provided as part of a request for an advertisement (e.g., via an advertisement tag embedded into the code of the web page), to determine a theme for the web page. Based on the determined theme, a manufacturer of golf clubs may opt to place an advertisement on the web page.

Audience-based advertising, in contrast to content-based advertising, involves selecting advertisements based on the user identifier visiting a web page, instead of the content of the web page itself. For example, a user identifier may be associated with making an online reservation at a golf resort and navigating to a financial web page to check the stock market. Based on golf being a potential interest category associated with the user identifier, for example, an advertisement from a manufacturer of golf clubs may be provided with the financial web page, even though the financial web page is unrelated to golf.

One or more implementations described herein may provide a method for identifying multiple models targeting nearly the same set of network user identifiers. After the multiple models are identified, the processing circuit may generate a representative model. This may result in moderate to significant memory space savings, depending on the diversity of the advertisers. Specifically, instead of saving a plurality of nearly identical, similar models, a serving system may only have to store the representative model. While it is possible to compress the size of the models or only load one model at a time, the implementations disclosed above may render these alternatives unnecessary.

Referring to FIG. 1, a block diagram of a computer system 100 in accordance with a described implementation is shown. System 100 includes a client 102 which communicates with other computing devices via a network 106. For example, client 102 may communicate with one or more content sources ranging from a first content source 108 up to an nth content source 110. Content sources 108, 110 may provide web pages and/or media content (e.g., audio, video, and other forms of digital content) to client 102. System 100 may also include an advertisement server 104, which provides advertisement data to other computing devices over network 106.

Network 106 may be any form of computer network that relays information between client 102, advertisement server 104, and content sources 108, 110. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client 102 may communicate wirelessly (e.g., via WiFi, cellular, radio, etc.) with a transceiver that is hardwired (e.g., via a fiber optic cable, a CAT5 cable, etc.) to other computing devices in network 106.

Client 102 may be any number of different electronic devices configured to communicate via network 106 (e.g., a laptop computer, a desktop computer, a tablet computer, a smartphone, a digital video recorder, a set-top box for a television, a video game console, etc.). Client 102 is shown to include a processor 112 and a memory 114, i.e., a processing circuit. Memory 114 stores machine instructions that, when executed by processor 112, cause processor 112 to perform one or more of the operations described herein. Processor 112 may include a microprocessor, application-specific integrated circuit (ASIC), field-programmable gate array (FPGA), etc., or combinations thereof. Memory 114 may include, but is not limited to, electronic, optical, magnetic, or any other storage or transmission device capable of providing processor 112 with program instructions. Memory 114 may further include a floppy disk, CD-ROM, DVD, magnetic disk, memory chip, application-specific integrated circuit (ASIC), field programmable gate array (FPGA), read-only memory (ROM), random-access memory (RAM), electrically-erasable ROM (EEPROM), erasable-programmable ROM (EPROM), flash memory, optical media, or any other suitable memory from which processor 112 can read instructions. The instructions may include code from any suitable computer-programming language such as, but not limited to, C, C++, C#, Java, JavaScript, Perl, Python and Visual Basic.

Client 102 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of client 102 (e.g., a built-in display, microphone, etc.) or external to the housing of client 102 (e.g., a monitor connected to client 102, a speaker connected to client 102, etc.), according to various implementations. For example, client 102 may include an electronic display 116, which visually displays web pages using web page data received from content sources 108, 110 and/or from advertisement server 104.

Content sources 108, 110 are electronic devices connected to network 106 and provide media content to client 102. For example, content sources 108, 110 may be computer servers (e.g., FTP servers, file sharing servers, web servers, etc.) or other devices that include a processing circuit. Media content may include, but is not limited to, web page data, a movie, a sound file, pictures, and other forms of data. Similarly, advertisement server 104 may include a processing circuit including a processor 120 and a memory 122.

In some implementations, advertisement server 104 may include several computing devices (e.g., a data center, a network of servers, etc.). In such a case, the various devices of advertisement server 104 may be in electronic communication, thereby also forming a processing circuit (e.g., processor 120 includes the collective processors of the devices and memory 122 includes the collective memories of the devices).

Advertisement server 104 may provide digital advertisements to client 102 via network 106. For example, content source 108 may provide a web page to client 102, in response to receiving a request for a web page from client 102. In some implementations, an advertisement from advertisement server 104 may be provided to client 102 indirectly. For example, content source 108 may receive advertisement data from advertisement server 104 and use the advertisement as part of the web page data provided to client 102. In other implementations, an advertisement from advertisement server 104 may be provided to client 102 directly. For example, content source 108 may provide web page data to client 102 that includes a command to retrieve an advertisement from advertisement server 104. On receipt of the web page data, client 102 may retrieve an advertisement from advertisement server 104 based on the command and display the advertisement when the web page is rendered on display 116.

According to some implementations, advertisement server 104 may be configured to determine whether the online behavior of a user identifier from client 102 is similar to that of other user identifiers. In some cases, advertisement server 104 may determine the similarity between the online behavior associated with a user identifier and that of other user identifiers associated with a desired action, such as purchasing a certain good or navigating to a certain web page. For example, a number of user identifiers may be associated with visiting web pages from content sources 108, 110 devoted to tourist attractions in Seattle and going on to purchase airline tickets to Seattle. In such a case, advertisement server 104 may determine that a user identifier associated with client 102 is similar to those user identifiers associated with a purchase of airline tickets to Seattle based on client 102 navigating to web pages provided by content sources 108, 110.

In some implementations, advertisement server 104 may receive browsing history data to determine the online behaviors of user identifiers around a certain event. In some implementations, advertisement server 104 may use cookies and/or pixel tags to determine an online behavior of a user identifier. For example, a cookie associated with advertisement server 104 may be placed on client 102 and used as a user identifier. Whenever client 102 navigates to a web page that includes an advertisement from advertisement server 104, the cookie may be used to identify client 102 as having visited the web page. Other mechanisms to determine a user's browsing history may be used, in various implementations. For example, client 102 may have a unique device ID which may be used to identify client 102 as it navigates between different websites. In some cases, client 102 may navigate to websites that are outside of the advertising network of advertisement server 104 (e.g., the website does not include an advertisement from advertisement server 104). In some implementations, advertisement server 104 may receive publisher-provided data (e.g., user identifiers) from websites that are outside of the advertising network.

A user of client 102 may opt in or out of allowing advertisement server 104 to identify and store data relating to client 102. For example, the user may opt in to receiving advertisements from advertisement server 104 that may be more relevant to them. In some implementations, the client identifier used by advertisement server 104 may be randomized and contain no personally-identifiable information about the user. For example, information relating to the user's name, demographics, etc., may not be used by advertisement server 104 unless the user opts in to providing such information. Thus, the user of client 102 may have control over how information is collected about them and used by advertisement server 104, in various implementations.

According to various implementations, advertising server 104 may generate a behavioral model based on the online behaviors of user identifiers associated with an online event, such as visiting a certain web page, purchasing a particular good or service, being added to a list of users by an advertiser, or the like. In some implementations, advertisement server 104 may receive a list of user identifiers from an advertiser (e.g., a set of cookies or other device identifiers). For example, an online retailer may provide a list of user identifiers associated with purchases of a certain good or service to advertisement server 104. Advertisement server 104 may use the provided list to determine a set of similar user identifiers by comparing the online behaviors of the user identifiers on the list to that of other user identifiers. In some cases, advertisement server 104 may provide an indication of the set of identified user identifiers back to the advertiser.

Figure 2:
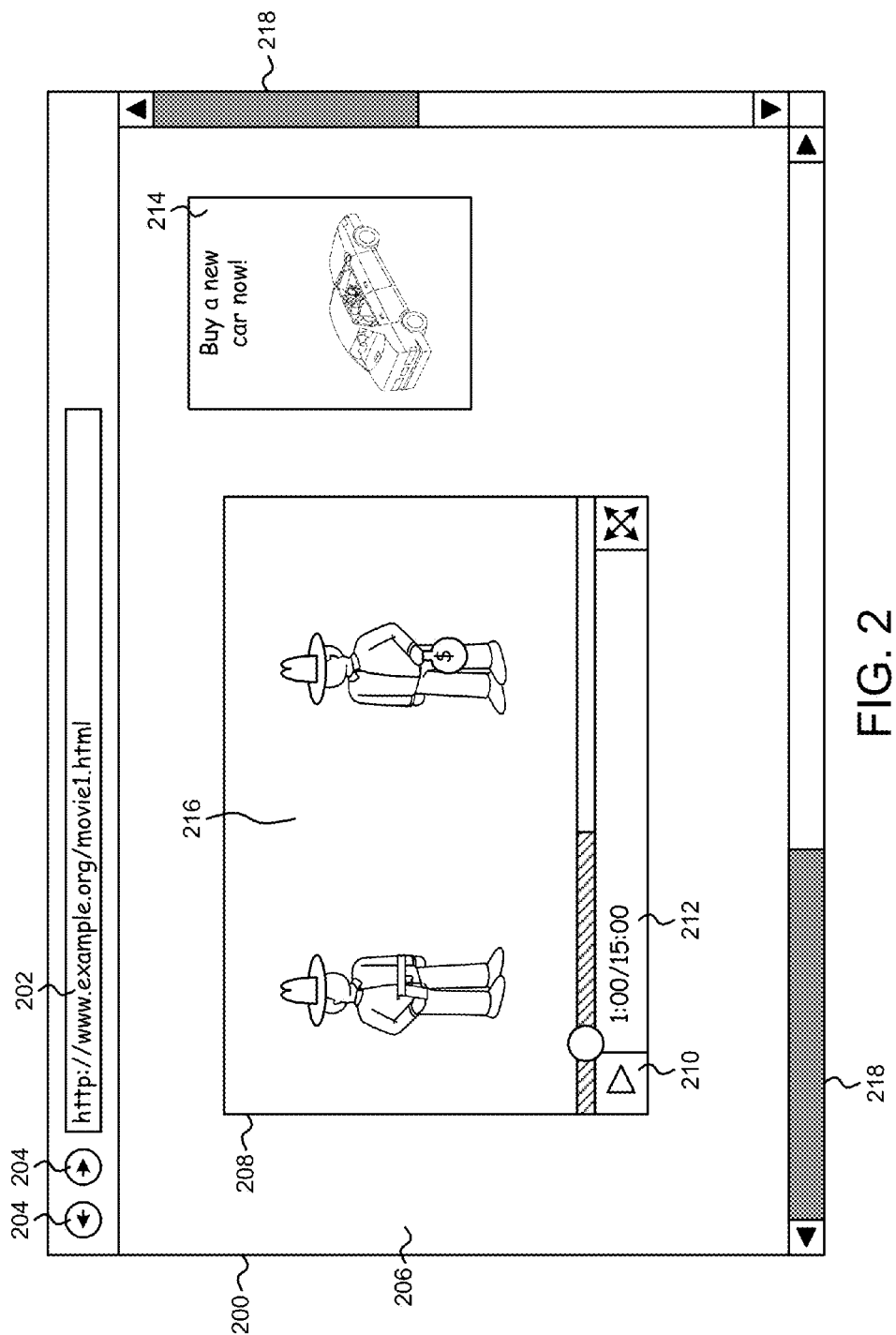
FIG. 2 is an illustration of an example web page having an advertisement.

Referring now to FIG. 2, an example display 200 is shown. Display 200 is in electronic communication with one or more processors that cause visual indicia to be provided on display 200. Display 200 may be located inside or outside of the housing of the one or more processors. For example, display 200 may be external to a desktop computer (e.g., display 200 may be a monitor), may be a television set, or any other stand-alone form of electronic display. In another example, display 200 may be internal to a laptop computer, mobile device, or other computing device with an integrated display.

As shown in FIG. 2, the one or more processors in communication with display 200 may execute a web browser application (e.g., display 200 is part of a client device). The web browser application operates by receiving input of a uniform resource locator (URL) into a field 202, such as a web address, from an input device (e.g., a pointing device, a keyboard, a touchscreen, or another form of input device). In response, one or more processors executing the web browser may request data from a content source corresponding to the URL via a network (e.g., the Internet, an intranet, or the like). The content source may then provide web page data and/or other data to the client device, which causes visual indicia to be displayed by display 200.

The web browser providing data to display 200 may include a number of navigational controls associated with web page 206. For example, the web browser may include the ability to go back or forward to other web pages using inputs 204 (e.g., a back button, a forward button, etc.). The web browser may also include one or more scroll bars 218, which can be used to display parts of web page 206 that are currently off-screen. For example, web page 206 may be formatted to be larger than the screen of display 200. In such a case, one or more scroll bars 218 may be used to change the vertical and/or horizontal position of web page 206 on display 200.

In one example, additional data associated with web page 206 may be configured to perform any number of functions associated with movie 216. For example, the additional data may include a media player 208, which is used to play movie 216. Media player 208 may be called in any number of different ways. In some implementations, media player 208 may be an application installed on the client device and launched when web page 206 is rendered on display 200. In other implementations, media player 208 may be part of a plug-in for the web browser. In other implementations, media player 208 may be part of the web page data downloaded by the client device. For example, media player 208 may be a script or other form of instruction that causes movie 216 to play on display 200. Media player 208 may also include a number of controls, such as a button 210 that allows movie 216 to be played or paused. Media player 208 may include a timer 212 that provides an indication of the current time and total running time of movie 216.

The various functions associated with advertisement 214 may be implemented by including one or more advertisement tags within the web page code located in "movie1.html" and/or other files. For example, "movie1.html" may include an advertisement tag that specifies that an advertisement slot is to be located at the position of advertisement 214. Another advertisement tag may request an advertisement from a remote location, for example, from an advertisement server, as web page 206 is loaded. Such a request may include client identification data (e.g., a cookie, device ID, etc.) used by the advertisement server as a user identifier. In this way, the advertisement server is able to determine browsing history associated with a user identifier as it is used to navigate between various web pages that participate in the advertising network (e.g., web pages that include advertisements from the advertisement server).

Figure 3:
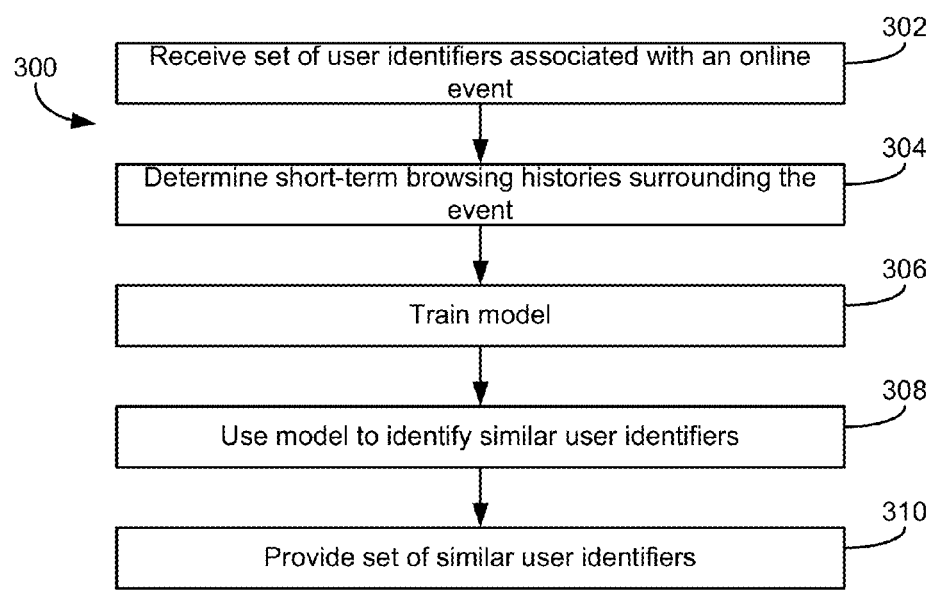
FIG. 3 is an example process for identifying similar online users.

Referring now to FIG. 3, an example process 300 for determining similar online user identifiers. In some implementations, advertisers may compete in an advertising auction for the ability to place an advertisement on a given web page. An advertiser having access to a set of user identifiers that are similar to other user identifiers associated with making a purchase, for example, may adjust their bid accordingly if one of the similar user identifiers requests a web page having an embedded advertisement.

Process 300 includes receiving data indicative of a set of user identifiers associated with an online event (block 302). In general, an online event may correspond to any action performed by an online user. For example, an online event may correspond to visiting a web page, clicking on a particular link (e.g., a hyperlink, an advertisement link, etc.), navigating between a set of web pages, ending their browsing session, spending a certain amount of time on a given web page, purchasing a good or service, or any other action that may be performed by an online user. In some implementations, the set of users may be represented using device identifiers (e.g., cookies, device IDs, etc.) for the electronic devices operated by the users. In some implementations, the set of user identifiers may also include information about when the event occurred with respect to a user in the set. For example, the received set may include information about when a particular user visited a web page, made a purchase, or performed any other online action.

In one example, an online retailer may wish to place advertisements via an advertising network. To provide relevant advertisements, the retailer may generate a list of user identifiers associated with visits to the retailer's website and/or purchases made via the website. The list of user identifiers may be a list of cookies, device IDs, or other information that can be used by the advertising network to determine online behaviors associated with the user identifiers on the list. For example, a mobile telephone having a unique device ID may be used to access the retailer's website. If the user has opted in to allowing information about the user to be collected, the retailer may record the device ID as a user identifier and provide it to the advertising network. The advertising network may then use the user identifier to identify similar user identifiers.

Process 300 includes determining short-term browsing histories surrounding the event (block 304). In some implementations, the system that receives the set of user identifiers may retrieve information regarding the browsing histories associated with the user identifiers in the set. For example, a server of an advertising network may store browsing history information for user identifiers that visited websites participating in the advertising network (e.g., websites that display advertisements provided by the advertising network). Such information may be collected, for example, by receiving identification information (e.g., a cookie, device ID, etc.) each time a user identifier is used to access a web page displaying an advertisement from the advertising network. Such information may be used to reconstruct, or partially reconstruct, a user's browsing history, provided that the user has opted in to allowing such information to be used. In other implementations, the browsing history may be predetermined by another device outside of the advertising network (e.g., the browsing history data may be publisher-provided).

The short-term browsing history for a user identifier refers to data about which web pages were visited within a particular period of the online event. In various implementations, the short-term browsing history for a user identifier surrounding an event may include data about the web pages visited by the user identifier less than one, two, five, twelve, or twenty four hours prior to the event. In some implementations, the short-term browsing history for a user identifier may include data about the web pages visited by the user identifier less than one, two, five, twelve, or twenty four hours after the occurrence of the event. In some implementations, long-term browsing histories may be used (e.g., browsing history data from a period longer than the particular period associated with the short-term browsing history). However, in contrast to long-term browsing history, short-term browsing history may provide more insight into a user identifier's interests surrounding the event. For example, a user may have a long-term interest in professional football. However, the user may have a short-term interest in purchasing flowers for his wife's birthday. Analyzing the user's short-term browsing history surrounding his online purchase of flowers may exclude the topic of football from being associated with the purchase of flowers. According to various implementations, the short-term browsing histories may be determined for the entire set of user identifiers or for a subset of the user identifiers (e.g., a random sampling of the user identifiers, a subset selected up to a predetermined amount of user identifiers, etc.).

Process 300 includes training a behavioral model (block 306). In some implementations, the browsing history data associated with the user identifiers in the received set may be used to train a behavioral model. In general, the behavioral model may determine commonalities among the online behaviors associated with the user identifiers. For example, a large number of user identifiers that purchase organic peanut butter from a retailer may have recently visited a web page devoted to a recipe for an all-organic peanut butter and banana sandwich. Such a characteristic may be used to identify other user identifiers that are also likely to become associated with purchasing organic peanut butter from the retailer.

Process 300 includes using the model to identify similar user identifiers to those in the received set (block 308). In general, the set of similar user identifiers may include device identifiers (e.g., cookies, unique device IDs, etc.) or other information that may be used to determine that a user identifier in the set of similar user identifiers is being used to request a web page. For example, the set of similar user identifiers may be provided to an advertiser and used by the advertiser to select relevant advertisements. In some implementations, the set of similar user identifiers may be provided to an advertising server that conducts an advertising auction (block 310). An advertiser may utilize the set of similar user identifiers to adjust auction bids to provide an advertisement to those user identifiers. For example, a user identifier that visits a web page devoted to plumbing repairs may have a browsing history similar to that of user identifiers associated with purchasing copper tubing. When the user identifier visits a web page, even a web page unrelated to plumbing, advertisers may participate in an auction to place an advertisement on the web page. In such a case, an advertiser may place a higher bid in the auction to provide an advertisement for copper tubing to the user identifier.

Figure 4:
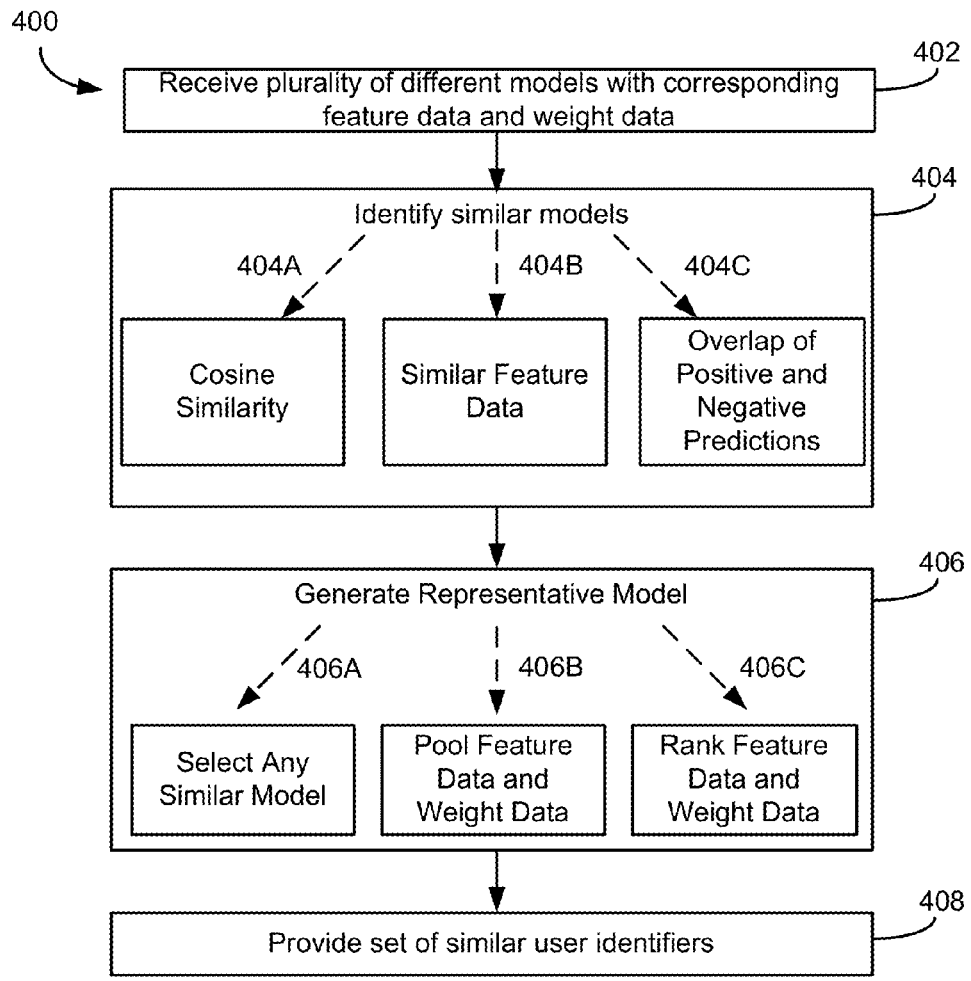
FIG. 4 is an example process for creating a representative model for a plurality of different models identified by similar feature data.

In some implementations, as illustrated in FIG. 4, the processing circuit performs process 400. Process 400 includes receiving (for example for storage in a memory) a plurality of different models (e.g., $M_1$, $M_2$, . . . $M_n$) (step 402). The plurality of different models can comprise any number or type of models. In general, a model is a description of observed or predicted behavior of some system, simplified by ignoring certain details. Models allow complex systems, both existent and merely specified, to be understood and their behavior predicted. A model may be used as the basis for simulation.

Each model is individually configured to receive a first set of network user identifiers, feature data associated with each network user identifier in the first set of network user identifiers, and a set of potential similar user identifiers that do not appear in the first set of network user identifiers (e.g., a pool of potential similar user identifiers, in the advertising network, who may or may not be similar user identifiers), and to generate a second set of network user identifiers (e.g., a set of similar user identifiers) based on the features of the first set of network user identifiers. Information contained in the models can be manually compiled and loaded into the system memory or automatically obtained from a program that tracks internet browsing activity for user identifiers that allow such tracking.

Each of the plurality of different models includes feature data and corresponding feature weight data. The corresponding feature weight data is fixed within each model and may relate to the weight each feature data of the model will be given when the representative model is generated.

Feature data can comprise information that describes if a network user belongs on the first set of network user identifiers. For example, feature data for each network user identifier in the first set of network user identifiers include, but are not limited to, web pages visited, topics in the web pages, salient keywords in the web pages, word clusters in the web pages, advertisements displayed on the web pages, advertisements clicked on, search terms entered for searches performed, products purchased, user identifiers' geography, user identifiers' demography, etc. In some implementations, information relating to the user identifier's name, geography, demographics, etc., may not be used by the advertisement server unless the user opts in to providing such information. Thus, the user may have control over how information is collected about him or her and used by the advertisement server.

As previously mentioned, the feature data associated with a model may include word clusters. According to various implementations, the content of a web page may be determined using word clusters. In general, a word cluster may be a set of words that convey the same or similar ideas. A word cluster may be a set of synonyms, according to some implementations. For example, the text of a web page may include the word "hotel." A word cluster that includes the word "hotel" may be as follows:

cluster_1={inn, hotel, hostel, lodge, motel, public house, spa}

Such a cluster may be used to identify web pages devoted to the same topic, but use different terminology to do so. In some cases, a word cluster may include words that have related, but different meanings. In some implementations, a characteristic of a web page may be a set of different word clusters. For example, the word "Seattle" may be part of a second word cluster that includes related terms:

cluster$_n$2={Seattle, Emerald City, Seatown, Rain City, Gateway to the Pacific}

A set of word clusters representing a web page may be as follows:

{cluster__1, cluster__2}

Such a cluster may be used to classify the web page as being related to hotels in Seattle.

A word cluster may be determined by a content analysis engine. The content analysis engine may be a clustering tool that gathers sets of words that relate to a common semantic concept. The engine may identify semantic similarity among documents, keywords, web pages, advertisements, etc. A content analysis engine may contain a training component that defines sets of words that are related to specific topics or semantic concepts, e.g., baseball, photography, camping, etc. A content analysis engine may also contain a component that evaluates a text fragment and returns word sets that are likely to match the text fragment. The text fragment may be words, phrases or numbers in a search query, web page, and/or advertisement. For example, a content analysis engine may automatically analyze the content of a web page to determine that the content of the web page is related to car insurance.

Process 400 includes identifying similar models within the plurality of different models (step 404). In some implementations, a computer examines the feature data and corresponding weight data of each model of the plurality of different models and measures a similarity between the plurality of different models. The similarity between the plurality of different models can be measured in different ways (e.g., alternative methods 404A, 404B and 404C), as will be described. Since models can have tens, hundreds, or thousands of different features and weights, using a computer to do the calculations needed to determine similarity can make the process feasible.

In some implementations, a computer executes a cosine similarity algorithm to determine the similarity between the plurality of different models (step 404A). Cosine similarity is a measure of similarity between two vectors by measuring the cosine of the angle between them. In this implementation, each model represents the network user identifiers as a set of feature vectors. In general, a feature vector refers to an nth dimensional vector of feature data of a network user. Cosine similarity is calculated according to the Equation 1 below:

$$\text{Similarity} = \cos(\Theta) = \frac{M_1 \cdot M_2}{\|M_1\|\|M_2\|} = \frac{\sum_{i=1}^{n} M_{1_i} \times M_{2_i}}{\sqrt{\sum_{i=1}^{n} (M_{1_i})^2} \times \sqrt{\sum_{i=1}^{n} (M_{2_i})^2}},$$ (Equation 1)

where $M_1$ and $M_2$ are two different models. The resulting similarity ranges from −1, meaning exactly opposite, to 1 meaning exactly the same, with 0 indicating independence. The values in between −1 and 1 indicate intermediate similarity. The advertising system may set a predetermined similarity threshold value. If the cosine similarity exceeds the predetermined similarity threshold value, the models are considered similar.

For example, Model 1 has features golf, wine tasting, and bicycling with corresponding weights 0.2, 0.9, and 0.5, respectively. Model 2 has features golf, wine tasting, and cooking with corresponding weights 0.3, 0.4, 0.9. Model 1 can be represented by the vector [0.2, 0.9, 0.5, 0] where the zero is the weight for the cooking feature, which is absent in Model 1. Model 2 can be represented by the vector [0.3, 0.4, 0, 0.9] where the zero is the weight for the bicycling feature, which is absent in Model 2. Using Equation 1, the cosine similarity between Model 1 and Model 2 is 0.39, indicating that the models are similar.

In another example, Model 1 has Model 1 has features golf, wine tasting, and bicycling with corresponding weights 0.2, 0.9, and 0.5, respectively. Model 2 has features golf, mystery books, and cooking with corresponding weights 0.3, 0.4, 0.9. Model 1 can be represented by the vector [0.2, 0.9, 0.5, 0, 0] where the zeroes are the weights for the mystery books and cooking features, which are absent in Model 1. Model 2 can be represented by the vector [0.3, 0, 0, 0.4, 0.9] where the zeroes are the weights for the wine tasting and bicycling features, which are absent in Model 2. Using Equation 1, the cosine similarity between Model 1 and Model 2 is 0.06, indicating that the models are less similar than in the previous example. In fact, since the cosine similarity is close to 0, the models are nearly independent of each other.

In other implementations, the similarity between the plurality of different models is measured by comparing advertiser based features of each model (step 504B). For example, if a model is associated with an advertiser that sells a category of goods or services, the model may be determined to be similar to models associated with advertisers who also sell within that category of goods or services. The premise of this assumption is that two similar advertisers would prefer to target a nearly identical audience. Therefore, the models should be similar. In some implementations, models are determined to be similar if the advertisers are classified in the same advertising category. In other implementations, based on the features present in the model, particularly, the word clusters, the processing circuit may calculate a similarity value for the models.

For example, if Beverage Company 1 and Beverage Company 2 both have a set of network user identifiers associated with drinking soft drink, each set of network user identifiers associated with a model, the corresponding feature data and weight data should be similar to select relevant content for soft drink consumers. The model for Beverage Company 1 may include feature data comprising word cluster__1={drink, soda, pop, cola}, while the model for Beverage Company 2 may include feature data comprising word cluster__2={drink, soda, pop, lime, lemon}. Both word clusters share the words "drink", "soda" and "pop" indicating that both models are targeting soft drink consumers, but cluster__1 includes the word "cola" and cluster__2 includes the words "lime" and "lemon." The inclusion of these words may result in a lower correlation, although it indicates that the models may simply be associated with network user identifiers associated with drinking different soda flavors. In contrast, Beverage Company 3 has a set of network user identifiers associated with drinking juice, the set associated with a model, the corresponding feature data and weight data should have some similarities and differences from Beverage Company 1 and Beverage Company 2 because of the different audiences. The model for Beverage Company 3 may include feature data comprising word cluster 3={drink, juice, smoothie, fruit}. All three word clusters share the word "drink" indicating that the advertiser sells beverages, but cluster__3 includes the words "juice" and "smoothie", which indicates that Beverage Company 3 may be focused on providing relevant content to a different audience, for example, an audience that drinks healthy smoothies instead of soda. Cluster_3 includes the word "fruit" which is similar to the words "lemon" or "lime" in cluster_2, indicating that Beverage Company 3 may be more similar to Beverage Company 2 than Beverage Company 1, which was focused on the cola flavor. This approach may result in a lower correlation if the advertisers have multiple sets of network user identifiers with different characteristics (e.g., sets associated with different flavors of soda, coupons for different products, etc.).

As part of step 404B, the processing circuit may calculate a similarity value based on the feature data and weight data of the models. If the similarity value exceeds a predetermined threshold value, the processing circuit identifies the advertisers to be similar.

In other implementations, the similarity between the plurality of different models is measured by scoring a sample set of network user identifiers by each of the models, measuring the overlap between positive predictions and negative predictions for each model, and measuring the degree of overlap (step 404C). To train the models, the processing circuit compiles a set of randomly selected user identifiers. The network user identifiers in the set of randomly selected user identifiers are randomly selected from two sets: 1) a set of network user identifiers that appear in a set of network user identifiers associated with any of the plurality of different models, and 2) a set of network user identifiers that do not appear in the set of network user identifiers associated with any of the plurality of different models. The set of network user identifiers that do not appear in the set of network user identifiers associated with any of the plurality of different models may be comprised, for example, of network user identifiers appearing in a set of network user identifiers associated with any model that is not the focus of the comparison, subject to the user opting out. To simplify the example, step 404C will be described with two models, Model 1 and Model 2, but this does not limit the number of models that can be compared. For example, consider three network user identifiers, user1, user2, and user3. User1 is in a set associated with Model 1, User2 is in a set associated with Model2, and User3 has not been in the set associated with either Model 1 or Model2. User3 exists in an advertisement display network, for example, in a set associated with Model3. The first set from which network user identifiers can be randomly selected consists of {user1 user2}, while the second set from which network user identifiers can be randomly selected consists of {user 3}.

Next, each model within the plurality of different models is used to identify similar user identifiers from the pool of potential similar user identifiers appearing in the set of randomly selected user identifiers. A positive prediction occurs when a model identifies a network user identifier from a set of network user identifiers that appear in a set of network user identifiers associated with any of the plurality of different models. A negative prediction occurs when a model identifies a network user identifier that does not appear in a set of network user identifiers associated with any of the plurality of different models. Using the example from above, a positive prediction may be the identification of user1 or user2 as a similar user identifier. A negative prediction may be the identification of user3 as a similar user identifier. The processing circuit identifies user3 as a negative prediction if user3's user identifier does not appear in the set of network user identifiers associated with Model 1 or Model 2.

The similarity between each model is calculated based on the degree of overlap between positive predictions and negative predictions. For example, consider a set of randomly selected user identifiers that is comprised of five user identifiers from the set associated with Model 1 (M1_1, M1_2, M1_3, M1_4, M1_5), five user identifiers from the set associated with Model 2 (M2_1, M2_2, M2_3, M2_4, M2_5), and five user identifiers that do not appear in the set associated with either Model 1 or Model 2 (MX_1, MX_2, MX_3, MX_4, MX_5). If Model 1 identifies 8 positive predictions (e.g. M1_1, M1_2, M1_3, M1_4, M2_1, M2_2, M2_3, M2_4) and 1 negative prediction (e.g. MX_1) of similar user identifiers from the set of randomly selected user identifiers, while Model 2 identifies 7 positive predictions (e.g. M1_2, M1_3, M1_4, M2_2, M2_3, M2_4, M2_5) and 1 negative prediction (e.g. MX_2) of similar user identifiers from set of randomly selected user identifiers, the models are considered similar because of the high degree of overlap between the positive predictions. In contrast, if Model 1 identifies 5 positive predictions (e.g. M1_1, M1_2, M1_3, M1_4, M1_5) and 1 negative prediction (e.g. MX_1) of similar user identifiers from the set of randomly selected user identifiers, while Model 2 identifies 5 positive predictions (e.g. M2_1, M2_2, M2_3, M2_4, M2_5) and 1 negative prediction (e.g. MX_2) of similar user identifiers from the set of randomly selected user identifiers, the models are not considered similar because there is no overlap between the positive predictions. The advertising system may set a predetermined degree of overlap required for the models to be considered similar. In other words, if the degree of overlap between the models exceeds the predetermined value, the models may be considered similar, but if the degree of overlap between the models is less than the predetermined value, the models may be considered not similar.

Process 400 includes generating a representative model to represent the similar models (step 406). The representative model is compiled and loaded into the system memory. The representative model may be generated in various ways (e.g., alternative methods 406A, 406B and 406C).

In some implementations, the representative model is generated by selecting any of the identified similar models to be the representative model (step 406A). This approach assumes that since the models are similar, any model can be used to provide relevant content to a nearly identical audience. In other implementations, the representative model is generated from the pool of feature data and weight data from each of the similar models (step 406B). In other words, the representative model will include every feature data present in each of the similar models with the weight data being determined by arithmetic average, weighted average, harmonic mean, or any other statistical measurement of the average. In various implementations, the representative model is generated by ranking the feature data represented by the similar models in order of importance and selectively picking the strongest feature data from each of the similar models according to the weight data associated with each feature data (step 406C). In this approach, feature strength may be measured by the magnitude of the weight data, the number of times a model has been trained on a feature data, revenue obtained by the model, the size of the set associated with a feature data, the quality of the set associated with a feature data, age of the feature data, etc.

The magnitude of the weight data is proportional with the strength of the feature data. For example, the higher the magnitude, the stronger the feature.

The number of times a model has been trained on a feature data may indicate the strength of a feature in that a feature that is present in the model for a longer, consistent period of time may be stronger than a feature that is present in the model once or twice. A feature that is present in the model once or twice may indicate network activity that occurs for only a short period of time.

The revenue obtained by the model may indicate the strength of the feature data in that the model has led to more conversions. In general, a conversion refers to a user, corresponding to a network user identifier, performing a certain action, typically, the purchase of a good or service. The higher the revenue obtained, the stronger the model, and thus, the feature data.

The size of the set associated with a feature data may correlate to the strength of the feature data in that the larger the set, the less strong a feature data may be because of the increased number of feature data in the pool of feature data. Alternatively, a feature data that is consistently present in a large set may indicate that the feature data is strong.

The quality of the set associated with the feature data may indicate the strength of the feature data in that the model has led to more conversions. This is different from measuring the revenue obtained by the model because conversions do not necessarily have to be the purchase of a good or service. Other examples of conversions include a user, corresponding to a network user identifier, creating a user profile on a web page, subscribing to receive marketing offers (e.g., by providing a postal or email address, by providing a telephone number, etc.), or downloading software from a web page. A high quality set leads to a high number of conversions, indicating that the feature data is strong.

The age of the feature data also indicate the strength of the feature data. Newer models are considered fresher than older models (e.g. models that represent network behavior associated with a period before the period associated with the newer models). Feature data that is present in newer models may be stronger than the feature data present in older models because the newer models are better indicators of current trends in network behavior.

The representative model may be optimized by continuing to select different numbers of feature data from the similar models. For example, if the similar models include 10 feature data with corresponding weight data, the representative model may be comprised of the 5 features with the highest weight data. To optimize the representative model, feature data can be added or deleted. For example, the representative model may be changed to include the 6 features with the highest weight data or the 4 features with the highest weight data, instead of the 5 features with the highest weight data.

The representative model can be used to generate a second set of similar network user identifiers (step 408) in a way similar to step 308 described in process 300 (FIG. 3). Using the representative model to generate the second set of similar network user identifiers for each set associated with the plurality of similar models used to generate the representative model results in moderate to significant memory space savings, depending on the diversity of the advertisers. Specifically, instead of saving a plurality of nearly identical, similar models, a serving system will only have to store the representative model. While it is possible to compress the size of the models or only load one model at a time, the implementations disclosed above render these alternatives unnecessary.

The processing circuit may generate display data configured to display the second set of similar network user identifiers.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied in a tangible medium, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus of processing circuit on data stored on one or more computer-readable storage devices or received from other sources.

The term "client" or "server" includes all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors or processing circuits executing one or more computer programs to perform actions by operating on input data and generating output. The processes and logic flows can also be performed by, and apparatus can also be implemented as, special purpose logic circuitry, e.g., an FPGA or an ASIC.

Processors or processing circuits suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor, for displaying information to the user and a keyboard, a pointing device, e.g., a mouse trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface (GUI) or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While the above description contains many specifics, these specifics should not be construed as limitations on the scope of the invention, but merely as exemplifications of the disclosed implementations. Those skilled in the art will envision many other possible variations that are within the scope of the invention as defined by the claims appended hereto.

What is claimed is:

1. A computerized method of generating a representative model for a plurality of different models identified by similar feature data, the method comprising:
   receiving, by a processing circuit, a first model and a second model, each of the first model and the second model configured for use in identifying a second set of network user identifiers as similar to a first set of network user identifiers;
   identifying, by the processing circuit, feature data associated with each of the first model and the second model, each feature data having a corresponding weight data;
   selecting a network user identifier pool including a plurality of network user identifiers, a subset of the network user identifier pool including at least one network user identifier that is included in at least one of the second set of network user identifiers identified by the first model or the second model and at least one network user identifier that is not included in the at least one of the second set of network user identifiers;
   determining, for each model of the first model and the second model, from the network user identifier pool, a network user identifier identified as similar to the first set of network user identifiers of the model;
   determining an overlap between positive predictions and negative predictions of the first model and the second model, a positive prediction between the first model and the second model occurring when each of the first model and the second model identifies a network user identifier from the network user identifier pool as a similar network user and a negative prediction between the first model and the second model occurring when either the first model identifies a network user identifier from the network user identifier pool that is not identified by the second model or the second model identifies a network user identifier from the network user identifier pool that is not identified by the first model;

calculating, for the first model and the second model, a degree of overlap between the positive predictions and the negative predictions;

identifying, by the processing circuit, that the first model and the second model are similar responsive to determining that the degree of overlap is greater than a threshold value; and generating, by the processing circuit, the representative model to represent the first model and the second model, the representative model configured for use in generating a second set of network user identifiers associated with the representative model based on a first set of network user identifiers associated with the representative model.

2. The method of claim 1, wherein generating the representative model comprises selecting one of the first model and the second model to be the representative model.

3. The method of claim 1, wherein generating the representative model comprises generating the representative model by including feature data from a pool of the feature data associated with each of the first model and the second model and calculating an average corresponding weight data for the each feature data.

4. The method of claim 1, wherein generating the representative model comprises generating the representative model by ranking the feature data and the corresponding weight data associated with each of the first model and the second model and selecting a predetermined number of high-ranking feature data from each of the first model and the second model.

5. The method of claim 1, further comprising providing the second set of network user identifiers associated with the representative model from the first set of network user identifiers associated with the representative model, based on the feature data and the corresponding weight data of the representative model.

6. A system of generating a representative model for a plurality of different models identified by similar feature data, the system comprising:

a memory; and one or more processors, the processors configured to receive a first model and a second model, each of the first model and the second model configured for use in identifying a second set of network user identifiers as similar to a first set of network user identifiers;

receive feature data associated with each of the first model and the second model, each feature data having a corresponding weight data;

select a network user identifier pool including a plurality of network user identifiers, a subset of the network user identifier pool including at least one network user identifier that is included in at least one of the second set of network user identifiers identified by at least one of the first model or the second model plurality of different models and at least one network user identifier that is not included in the at least one of the second set of network user identifiers identified by at least one of the plurality of different models;

determine, for each model of the first model and the second model, from the network user identifier pool, a network user identifier identified as similar to the first set of network user identifiers of the model;

determining an overlap between positive predictions and negative predictions of the first model and the second model, a positive prediction between the first model and the second model occurring when each of the first model and the second model identifies a network user identifier from the network user identifier pool as a similar network user and a negative prediction between the first model and the second model occurring when either the first model identifies a network user identifier from the network user identifier pool that is not identified by the second model or the second model identifies a network user identifier from the network user identifier pool that is not identified by the first model; and calculate, for the first model and the second model, a degree of overlap between the positive predictions and the negative predictions;

identify that the first model and the second model are similar responsive to determining that the degree of overlap is greater than a threshold value; and generate the representative model to represent the first model and the second model, the representative model configured for use in generating a second set of network user identifiers associated with the representative model based on a first set of network user identifiers associated with the representative model.

7. The system of claim 6, wherein generating the representative model comprises selecting one of the first model and the second model to be the representative model.

8. The system of claim 6, wherein generating the representative model comprises generating the representative model by including the feature data from a pool of the feature data associated with each of the first model and the second model and calculating an average corresponding weight data for the each feature data.

9. The system of claim 6, wherein generating the representative model comprises generating the representative model by ranking the feature data and the corresponding weight data associated with each of the first model and the second model and selecting a predetermined number of high-ranking feature data from each of the first model and the second model.

10. The system of claim 6, further comprising providing a second set of network user identifiers associated with the representative model from a first set of network user identifiers associated with the representative model, based on the feature data and the corresponding weight data of the representative model.

11. The system of claim 10, further comprising generating display data configured to display the second set of user identifiers associated with the representative model on a user interface.

12. A non-transitory computer-readable medium having instructions thereon that cause one or more processors to perform operations, the operations comprising:

receiving a first model and a second model, each of the first model and the second model configured for use in identifying a second set of network user identifiers as similar to a first set of network user identifiers;

receiving feature data associated with each of the first model and the second model, each feature data having a corresponding weight data;

selecting a network user identifier pool including a plurality of network user identifiers, a subset of the network user identifier pool including at least one network user identifier that is included in at least one of the second set of network user identifiers identified by the first model or the second model and at least one network user identifier that is not included in the at least one of the second set of network user identifiers;

determining, for each model of the first model and the second model, from the network user identifier pool, a network user identifier identified as similar to the first set of network user identifiers of the model;

determining an overlap between positive predictions and negative predictions of the first model and the second model, a positive prediction between the first model and the second model occurring when each of the first model and the second model identifies a network user identifier from the network user identifier pool as a similar network user and a negative prediction between the first model and the second model occurring when either the first model identifies a network user identifier from the network user identifier pool that is not identified by the second model or the second model identifies a network user identifier from the network user identifier pool that is not identified by the first model;

calculating, for the first model and the second model, a degree of overlap between the positive predictions and the negative predictions;

identifying, by the processing circuit, that the first model and the second model are similar responsive to determining that the degree of overlap is greater than a threshold value; and generating the representative model to represent the first model and the second model, the representative model configured for use in generating a second set of network user identifiers associated with the representative model based on a first set of network user identifiers associated with the representative model.

13. The computer-readable medium of claim 12, wherein the operations further comprise providing the second set of network user identifiers associated with the representative model from the first set of network user identifiers associated with the representative model, based on the feature data and the corresponding weight data of the representative model.

* * * * *